US006271334B1

United States Patent
Moos et al.

(10) Patent No.: US 6,271,334 B1
(45) Date of Patent: *Aug. 7, 2001

(54) SPRAYABLE COATING COMPOSITIONS COMPRISING OXAZOLIDINES AND ISOCYANATES

(75) Inventors: Jan Wilhelm E. Moos, Boskoop (NL); Heide Anne Lochbiler, Sterling Heights, MI (US); Jason Donald Weaver, New Baltimore, MI (US); Latoska Nikita Price, Southfield, MI (US); Frances Lamb, Northville, MI (US); Donald Lynn Rutledge, Jr., Farmington Hills, MI (US); Ann Alfred J. Lemaire, Leiderdorp (NL); Antonius Hendrikus G. van Engelen, Troy, MI (US); Catharine Marie Den Breejen, Dordrecht (NL)

(73) Assignee: Akzo Nobel NV (NL)

(*) Notice: Subject to any disclaimer, the term of this patent is extended or adjusted under 35 U.S.C. 154(b) by 0 days.

This patent is subject to a terminal disclaimer.

(21) Appl. No.: 09/498,681

(22) Filed: Feb. 7, 2000

Related U.S. Application Data

(63) Continuation of application No. PCT/EP98/04943, filed on Jul. 13, 1998, now abandoned, which is a continuation of application No. 09/012,166, filed on Jan. 22, 1998, which is a continuation-in-part of application No. 08/906,644, filed on Aug. 7, 1997, now abandoned, and a continuation-in-part of application No. 08/906,645, filed on Aug. 7, 1997, now Pat. No. 5,977,285.

(51) Int. Cl.$^7$ .................................................. C08G 18/30
(52) U.S. Cl. ......................... 528/73; 528/74; 428/423.1; 428/425.8; 428/421; 428/422
(58) Field of Search ..................... 528/73–74; 428/423.1, 428/425.8, 421, 422

(56) References Cited

U.S. PATENT DOCUMENTS

| | | | |
|---|---|---|---|
| 3,707,521 | 12/1972 | De Santis | 260/37 |
| 3,743,626 | 7/1973 | Emmons | 260/77.5 |
| 3,864,335 | 2/1975 | Emmons | 260/240 |
| 4,002,601 | 1/1977 | Hajek et al. | 260/77.5 |
| 4,002,637 | 1/1977 | Lewis et al. | 260/307 |
| 4,035,557 | 7/1977 | Jones | 526/14 |
| 4,046,744 | 9/1977 | Jenkins | 260/77.5 |
| 4,101,527 | 7/1978 | Cunningham et al. | 528/73 |
| 4,381,388 | 4/1983 | Naples | 528/59 |
| 4,816,542 | 3/1989 | Liebl et al. | 528/59 |
| 5,126,421 | 6/1992 | Majewski et al. | 528/44 |
| 5,143,994 | 9/1992 | Laas et al. | 528/45 |
| 5,157,100 | 10/1992 | Babjak et al. | 528/73 |
| 5,214,086 | 5/1993 | Mormile et al. | 524/237 |
| 5,219,979 | 6/1993 | Greco | 528/220 |
| 5,264,148 | 11/1993 | Chou et al. | 252/194 |
| 5,391,614 | 2/1995 | Chandalia et al. | 524/759 |
| 5,412,056 | 5/1995 | Zwiener et al. | 528/73 |
| 5,461,135 | 10/1995 | Malofsky et al. | 528/60 |
| 5,506,328 | 4/1996 | Chandalia et al. | 528/49 |
| 5,506,329 | 4/1996 | Chou et al. | 528/60 |
| 5,606,001 | 2/1997 | Shaffer | 528/49 |
| 5,744,569 | 4/1998 | Bruchmann et al. | 528/73 |
| 5,977,285 | * 11/1999 | Moos | 528/73 |

FOREIGN PATENT DOCUMENTS

| | | | |
|---|---|---|---|
| 2049695 | 2/1993 | (CA) | C08G/18/10 |
| 0 499 188 | 8/1992 | (EP) | C07D/263/04 |
| 0 531 249 | 3/1993 | (EP) | C08G/18/65 |
| 0 686 654 | 12/1995 | (EP) | C08G/18/32 |
| 992721 | 5/1965 | (GB) . | |
| WO 92/13907 | 8/1992 | (WO) | C08G/18/10 |
| WO 93/17060 | 9/1993 | (WO) | C08G/63/02 |
| WO 94/27746 | 12/1994 | (WO) | B05D/7/24 |
| WO 95/14528 | 6/1995 | (WO) | B01J/13/00 |
| WO 96/08308 | 3/1996 | (WO) | B01J/13/00 |

OTHER PUBLICATIONS

*International Search Report*, dated Nov. 27, 1998 (PCT/EP98/04942).
*International Search Report*, dated Dec. 4, 1998 (PCT/EP98/04943).
*International Search Report*, dated Dec. 11, 1998 (PCT/EP98/04944).
Angus Chemical Company Technical Bulletin TB 91 Zoldine® RD–20, 1–8 (1994).
Rohm and Haas Company Acryloid® Resins, Maintenance and Marine Coatings, Experimental Reactive Modifier QM–1007M, Reactive Diluent for Increasing Paint Solids and Improving Film Building of Acrylic–Urethane Coatings, 1990, pp. 1–20.
Donald C. Schall, High Solids Isocyanate–Oxazolidine Coatings, Presented at the Water–Borne & High–Solids coatings Symposium, Feb. 13–15, 1985, New Orleans, Louisiana pp. 120–139.

* cited by examiner

*Primary Examiner*—Rachel Gorr
(74) *Attorney, Agent, or Firm*—Joan M. McGillycuddy

(57) ABSTRACT

The present invention relates to a coating composition comprising:
  (a) a bicyclic oxazolidine compound;
  (b) a monocyclic oxazolidine compound; and
  (c) an isocyanate functional compound.

The invention further relates to a method of coating a substrate with the coating composition and to a substrate coated with the coating composition.

10 Claims, No Drawings

SPRAYABLE COATING COMPOSITIONS COMPRISING OXAZOLIDINES AND ISOCYANATES

This is a continuation of International Application No. PCT/EP98/04943, with an international filing date of Jul. 13, 1998 now abandoned, designating the United States of America, expressly abandoned after the filing and acceptance of the present application. This application claims priority and a continuation of U.S. patent application Ser. No. 09/012,166, filed Jan. 22, 1998, U.S. patent application and a continuation of 08/906,644, filed Aug. 7, 1997, now abandoned and U.S. patent application Ser. No. 08/906,645 now filed Aug. 7, 1997 patented as U.S. Pat. No. 5,977,285.

FIELD OF THE INVENTION

The present invention relates to a new coating composition based on oxazolidines and isocyanates.

BACKGROUND OF THE INVENTION

Coatings used for painting motor vehicles and repairing the original paint are required to have good physical properties such as hardness, mechanical strength, and resistance to water, acids, and solvents. The coatings are also required to have good appearance properties, which means that films must be smooth and have a high gloss and high distinctness of image (DOI). It is also desirable that all properties be retained under prolonged outdoor weathering.

For environmental reasons, it is required to use a coating composition which can be applied easily using spray application at a low volatile organic content (VOC). Coatings with a lower organic solvent content emit lower levels of solvent when they are used and so the atmosphere becomes less polluted.

One way to achieve a lower solvent content is to use so-called high-solids compositions. Such compositions comprise a relatively high level of non-volatile materials, such as film forming polymer, pigments and fillers, and a relatively low level of organic solvent. A problem when formulating high-solids coating compositions is that such compositions have an unacceptably high viscosity due to the high molecular weight of the conventional film forming polymer. The high viscosity gives rise to problems in spray application with poor paint atomization and poor flow-out and, consequently, low gloss levels and poor appearance.

The use of low-molecular weight film forming polymers, which results in adequate application viscosities, has as a disadvantage that the resulting coating is soft and marks easily. The hardness build-up of the coating is therefore unacceptable.

Another way to reduce the amount of volatile organic compounds in coating compositions is the use of reactive diluents. Examples of reactive diluents include amidines and ketimines. In EP-A-0 686 654 such compounds are discussed. Other reactive diluents, such as oxazolidines, are mentioned but it is stated that they have limited utility as a sole reaction partner with isocyanate because of generally slow setting film properties.

Amidines are used as reactive diluents for low VOC paint systems. These diluents are commercially available and use of such amidines is referred to in U.S. Pat. No. 5,214,086 and EP-A-0 686 654. In general these reactive diluents offer good cure and hardness development. However, they are known to cause skin irritation and to cause adhesion failure when applied in low VOC clearcoats.

Bicyclic oxazolidines are also used as reactive diluents for low VOC paint systems. These diluents are commercially available and use of such bicyclic oxazolidines are referred to in WO 95/14528. In general, these reactive diluents offer good durability and color stability and low toxicity. However, compositions based on bicyclic oxazolidines may exhibit an unacceptably long time to cure.

Monocyclic oxazolidines are also used as reactive diluents for low VOC paint systems. Coating compositions based on monocyclic oxazolidines are also referred to in EP 0 499 188 A1. Monocyclic oxazolidines and dimers of the same are commercially available. Coating compositions based on monocyclic oxazolidines may exhibit a loss of adhesion over time.

While the use of mono- or bi-cyclic oxazolidines has been described (see, e.g., U.S. Pat. No. 5,126,421), nowhere is there described the use of both monocyclic and bicyclic oxazolidines. WO 92/13907 refers to the use of monocyclic and bicyclic oxazolidines (page 7, lines 20–21), but this reference relates to the use of these compounds in the alternative and does not disclose a mixture of the two oxazolidines.

Surprisingly it was found that the use of mixtures of bicyclic and monocyclic oxazolidines in low VOC coatings provide properties that can compete with those of imines, but without loss of adhesion.

SUMMARY OF THE INVENTION

The present invention relates to a coating composition comprising:
 (a) a bicyclic oxazolidine compound;
 (b) a monocyclic oxazolidine compound; and
 (c) an isocyanate functional compound.

The variables recited in the following formulae are intended to be chosen independently both within one moiety to the next, and from one component to the next.

DETAILED DESCRIPTION OF THE INVENTION

Preferably, the bicyclic oxazolidine component (a) has the structure:

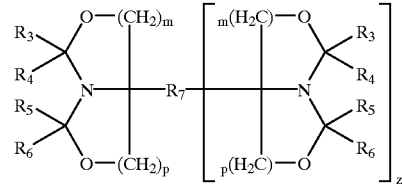

wherein
 z is from 0 to 9;
 m and p are independently selected from 1 and 2;
 $R_3$, $R_4$, $R_5$ and $R_6$ may be the same or different and are selected from the group of hydrogen, linear or branched (cyclo)alkyl, and linear or branched aryl, optionally substituted;
 $R_3$ and $R_4$, and $R_5$ and $R_6$ may be joined together to form a 5 or 6 carbon ring with the attached carbon atom of the ring in the formula, i.e. $R_3$ and $R_4$, and $R_5$ and $R_6$ collectively represent a tetramethylene or a pentamethylene group; and
 $R_7$ is a mono or multivalent aliphatic, aromatic, arylaliphatic or cycloaliphatic moiety which may optionally contain oxygen, nitrogen, sulphur, and silica; and $R_7$ may be H when z=0.

Preferably, z is from 0 to 3. Preferably m and p are 1. Preferably, $R_3$, $R_4$, $R_5$ and $R_6$ are selected from the group of hydrogen, phenyl, benzyl and a linear or branched $C_{1-12}$ alkyl group. More preferably, $R_3$, $R_4$, $R_5$, and $R_6$ are selected from the group of hydrogen and isopropyl.

More preferably, z is 0 and $R_7$ is an alkyl group comprising 1 to 10 carbon atoms, more preferably methyl, ethyl or propyl. Most preferably, component (a) comprises 1-aza-3,7-dioxo-2,8-diisopropyl-5-ethyl bicyclo(3,3,0)octane, which is available commercially under the tradename "ZOLDINER®" RD-20 from Angus Chemical Company (Buffalo Grove, Ill.) and has the structure:

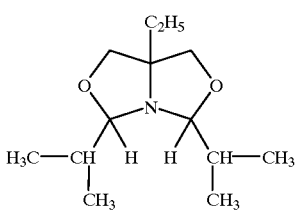

The bicyclic oxazolidine component (a) may comprise a mixture of bicyclic oxazolidines.

Preferably, the monocyclic oxazolidine (component (b) of the present invention has the general structure:

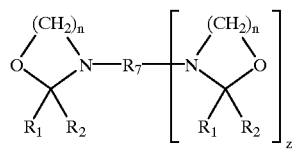

wherein
z is from 0 to 9;
n is 2 or 3;

$R_1$ and $R_2$ may be the same or different and are selected from the group of hydrogen, linear or branched (cyclo) alkyl, and linear or branched aryl, optionally substituted;

$R_1$ and $R_2$ may be joined together to form a 5 or 6 carbon ring with the attached carbon atom of the ring in the formula, i.e. $R_1$ and $R_2$ collectively represent a tetramethylene or a pentamethylene group; and $R_7$ is a mono- or multivalent aliphatic, aromatic, arylaliphatic or cycloaliphatic moiety which may optionally contain oxygen, nitrogen, sulphur, and silica; and $R_7$ may be H when z=0.

Preferably z is from 0 to 3. Preferably n is 2. Preferably $R_1$ and $R_2$ are selected from the group of hydrogen, phenyl, benzyl and a linear or branched $C_{1-12}$ alkyl group. More preferably, $R_1$ and $R_2$ are selected from the group of hydrogen and isopropyl.

Preferably, $R_7$ is multivalent and more preferably $R_7$ is an aliphatic, arylaliphatic or cycloaliphatic moiety comprising 2 to 15 carbon atoms and, optionally, ester, carbonate, and urethane groups. Monocyclic oxazolidines wherein $R_7$ comprises ester groups may be based on acrylate polymers such as described in GB-B-992,721.

More preferably, z is 1 and $R_7$ is a divalent moiety comprising either a carbonate group or at least two urethane groups. Compounds having an $R_7$ group comprising carbonate groups are described in EP-A-0 499 188. $R_7$ may be for example:

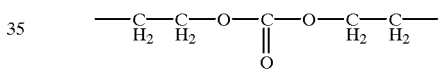

When $R_7$ comprises at least two urethane groups, $R_7$ may be selected from the group of the following multivalent moieties:

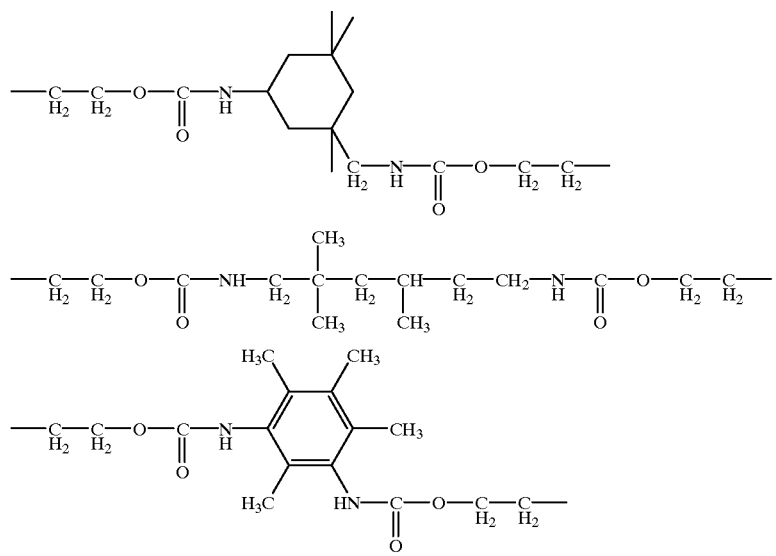

Most preferably, z is 1, n is 2, $R_1$ is hydrogen, $R_2$ is isopropyl, and $R_7$ is:

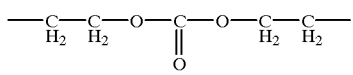

This embodiment is commercially available under the tradename "INCOZOL™" LV (from Industrial Copolymers Ltd., Preston, Lancashire, UK).

The monocyclic oxazolidine component (b) may comprise a mixture of monocyclic oxazolidines.

The weight ratio of bicyclic oxazolidine to monocyclic oxazolidine is preferably in the range of 5:1 to 1:2. More preferably, there is a 3:1 to 1:1 ratio of bicyclic to monocyclic oxazolidine. Most preferably, there is a 2:1 ratio.

Component (c) comprises an isocyanate functional compound and can be an aromatic, aliphatic, cycloaliphatic and/or araliphatic. Component (c) can be an isocyanurate, uretdione, biuret, allophanate, an adduct, NCO prepolymers, or mixtures thereof.

Examples of suitable isocyanates to be used as the isocyanate functional compound, or as starting materials for preparing an isocyanate functional compound comprising an isocyanurate, biuret or uretdione structure include organic polyisocyanates represented by the formula $$R(NCO)_k$$

wherein k is 2 or higher and R represents an organic group obtained by removing the isocyanate groups from an organic polyisocyanate having aromatically or (cyclo)aliphatically bound isocyanate groups. Preferred diisocyanates are those represented by the above formula wherein k is 2 and R represents a divalent aliphatic hydrocarbon group having 2 to 18 carbon atoms, a divalent cycloaliphatic hydrocarbon group having 5 to 15 carbon atoms, a divalent araliphatic hydrocarbon group having 7 to 15 carbon atoms or a divalent aromatic hydrocarbon group having 6 to 15 carbon atoms. Examples of the organic diisocyanates which are particularly suitable include ethylene diisocyanate, 1,3-propylene diisocyanate 1,4-tetramethylene diisocyanate, 1,6-hexamethylene diisocyanate, 2,2,4-trimethyl-1,6-hexamethylene diisocyanate, 2-methyl-1,5-diisocyanate pentane, 2-ethyl-1,4-diisocyanate butane, 1,12-dodecamethylene diisocyanate, cyclohexane-1,3- and -1,4-diisocyanate, 1-isocyanato-2-isocyanatomethyl cyclopentane, IPDI, bis-(4-isocyanatocyclohexyl)-methane, 2,4'-dicyclohexylmethane diisocyanate, 1,3- and 1,4-bis (isocyanatomethyl)-cyclohexane, bis-(4-isocyanato-3-methyl-cyclohexyl)-methane, 1-methyl-2,4-diisocyanato cyclohexane, 1-isocyanato-1-methyl-4(3)-isocyanatomethyl cyclohexane, xylene diisocyanate, 1-methyl-2,4-diisocyanato benzene, α,α,α',α'-tetramethyl-1,3- and -1,4-xylylene diisocyanate, 2,4- and 2,6-hexahydrotoluylene diisocyanate, 1,3- and 1,4-phenylene diisocyanate, 2,4- and 2,6-toluylene diisocyanate, 2,4- and 4,4'-diphenylmethane diisocyanate, 1,5-diisocyanato naphthalene and mixtures thereof. Aliphatic polyisocyanates containing 3 or more isocyanate groups such as 4-isocyanatomethyl-1,8-octane diisocyanate and aromatic polyisocyanates containing 3 or more isocyanate groups such as 4,4',4"-triphenylmethane triisocyanate, 1,3,5-triisocyanate benzene, polyphenyl polymethylene polyisocyanates obtained by phosgenating anilline/formaldehyde condensates, the adduct of TMP and m-tetramethylxylylene diisocyanate, and mixtures thereof may also be used. Preferred diisocyanates are 1,6hexamethylene diisocyanate and IPDI.

Examples of suitable polyisocyanates to be used as the isocyanate functional compound or as starting materials for preparing the isocyanate functional compound comprising an allophanate structure include the above-mentioned organic polyisocyanates reacted with a mono- or polyalcohol.

Suitable mono- or polyalcohols which may be used to prepare the polyisocyanates containing allophanate groups include aliphatic, cycloaliphatic, araliphatic or aromatic mono- or polyalcohols. The mono- or polyalcohols may be linear, branched or cyclic, contain at least one carbon atom and have a molecular weight of up to 2500. The mono- or polyalcohols may optionally contain other hetero atoms in the form of, e.g., ether groups, ester groups, etc. However, the mono- or polyalcohols preferably do not contain hetero atoms other than the hydroxyl group(s). The molar ratio of mono- or polyalcohol to polyisocyanate is about 0.01 to 0.5, preferably about 0.04 to 0.2. Preferred mono- or polyalcohols are hydrocarbon mono- or polyalcohols and mono- or polyalcohols containing ether groups. The hydrocarbon mono- or polyalcohols preferably contain 1 to 36, more preferably 1 to 20 and most preferably 1 to 8 carbon atoms.

Examples of suitable monoalcohols include methanol, ethanol, n-propanol, isopropanol, n-butanol, isobutanol, t-butanol, n-pentanol, 2-hydroxy pentane, 3-hydroxy pentane, the isomeric methyl butyl alcohols, the isomeric dimethyl propyl alcohols, neopentyl alcohol, n-hexanol, n-heptanol, n-octanol, n-nonanol, 2-ethyl hexanol, trimethyl hexanol, decanol, dodecanol, tetradecanol, hexadecanol, octadecanol, 2,6,8-trimethyinonanol, 2-t-butyl-cyclohexanol, 4-cyclohexyl-1-butanol, cyclohexanol, benzyl alcohol, phenol, the cresols, the xylenols, the trimethylphenols, 2,4,6-trimethyl benzyl alcohol, branched chain primary alcohols and mixtures thereof (which are available from Henkel (Minneapolis, Minn.) under the "STANDAMUL®" trademark) and mixtures of linear primary alcohols (which are available from Shell (Houston, Tex.) under the "NEODOL®"trademark).

Preferred ether-containing monoalcohols include ethoxy methanol, methoxy ethanol, ethoxy ethanol, the isomeric methoxy or ethoxy propanols, the isomeric propoxy methanols and ethanols, the isomeric methoxy butanols, the isomeric butoxy methanols, furfuralcohol and other monoalcohols which have a molecular weight of up to 2500 and are based on ethylene oxide, propylene oxide and/or butylene oxide. It is also possible in accordance with the present invention to use mixtures of the previously described monoalcohols.

Examples of suitable polyalcohols having two or more hydroxyl groups include ethane diol, 1,3-propanediol, 1,2-propanediol, 2-methyl-1,3-propanediol, 1,4-butanediol, 1,3-butanediol, 1,6-hexanediol, neopentylglycol, glycerol, pentaerythritol, trimethylol propane, ditrimethylol propane, 1,4-cyclohexane dimethanol, the monoester of neopentylglycol and hydroxy pivalic acid, 2,2,4-trimethyl pentanediol, and dimethylol propionic acid, and mixtures thereof. Other preferred polyalcohols for the production of suitable polyurethanes include polyester and polyether diols having a number average molecular weight of less than 1000, for example the polyester diol prepared form I mole of phthalic anhydride and 2 moles of neopentyl glycol. It is also possible in accordance with the present invention to use mixtures of the polyalcohols and mixtures of a polyalcohol and the previously described monoalcohols.

Preferably, isocyanate functional compound comprising an allophanate structure are prepared from 1,6-hexamethylene diisocyanate and/or IPDI reacted with an alcohol, preferably butanol.

Polyisocyanate adducts include the adduct of TMP and m-tetramethylxylylene diisocyanate.

The NCO prepolymers are prepared from the previously described monomeric polyisocyanates, preferably monomeric diisocyanates, and organic compounds containing at least two isocyanate-reactive groups, preferably at least two hydroxy groups. These organic compounds include high molecular weight compounds having number average molecular weights of 400 to about 6,000, preferably 800 to about 3,000, and optionally low molecular weight compounds with molecular weights below 400. Products obtained by reacting polyisocyanates exclusively with low molecular weight compounds are polyisocyanate adducts containing urethane groups and are not considered to be NCO prepolymers. Examples of the high molecular weight compounds are polyester polyols, polyether polyols, polyhydroxy polycarbonates, polyhydroxy polyacetals, polyhydroxy polyacrylates, polyhydroxy polyester amides and polyhydroxy polythioethers. The polyester polyols, polyether polyols and polyhydroxy polycarbonates are preferred. Further details concerning the low molecular weight compounds and the starting materials and methods for preparing the high molecular weight polyhydroxy compounds are disclosed in U.S. Pat. No. 4,701,480. These NCO prepolymers are prepared in known manner by the reaction of the above-mentioned starting materials at an NCO/OH equivalent ratio of about 1.05:1 to 10:1 preferably about 1.1:1 to 3:1. This reaction may take place in a suitable solvent which may optionally be removed by distillation after the reaction along with any unreacted volatile starting polyisocyanates still present. Prefered aromatic isocyanates are "DESMODUR®" IL (isocyanurate of toluene diisocyanate (TDI)), "DESMODUR®" VL (diphenyl methyl-4,4'-diisocyanate prepolymer) and "DESMODUR®" L75 (TDIltrimethyol propane(TMP) adduct) (all available from Bayer, Pittsburgh, Pa.). Prefered aliphatic or cycloaliphatic isocyanates are "DESMODUR®" N3400 (uretdione of hexamethylene diisocyanate (HDI)), "DESMODUR® N3300" (isocyanurate of HDI) and "VESTANAT®" T1890 (isocyanurate of isophorone diisocyanate (IPDI))(available from Hüls, Chicago, Ill.). Preferably, component (c) is an aliphatic or cyclo-aliphatic isocyanate. More preferably, component (c) is mixture of isocyanate functional compounds, preferably with at least one uretdione and at least one isocyanurate. More preferably, the mixture comprises "DESMODUR®" N3400, "DESMODUR®" N 3300 and "VESTANAT®" T890.

The isocyanate functional compound comprising a uretdione structure is preferably present in an amount of at least 5% by weight, preferably at least 10% by weight, based on the solids content of the polyisocyanate component (c).

The coating composition of the present invention may further comprise a component (d). Component (d) comprises a resin comprising a functional group selected from hydroxyl and amine. The hydroxyl functional resin may be an acrylic, polyester, polyether, polyurethane functional resin or other constituent materials known in the art, and may be a mixture thereof. Some commercial examples of acrylic hydroxyls are "JONCRYL®" 500 (S.C. Johnson & Son, Inc., Racine, Wis.) and AU608 (Rohm and Haas, Philadelphia, Pa.). Preferably, the hydroxyl functional resin is a mixture of a polyester resin and a polyurethane polyol.

Alternately, component (d) comprises an amine functional resin. Suitable compounds may be aliphatic, aromatic, cycloaliphatic and/or araliphatic, may contain a saturated, an unsaturated group, O, S or N, and include ethylene diamine, ethylene glycol diamine, propylene glycol diamine, and cycloaliphatic diamines. Preferably, the amine functional resin is an aspartic acid ester. Suitable resins are available commercially from Bayer under the tradenames "DESMOPHEN® XP 7052 (sterically hindered amines—adduct of 2 moles diethylmaleate with the amine "LAROMIN®" C. 260 (BASF, Germany)) and "DESMOPHEN®" XP 7053 (adduct of 2 moles diethylmaleate with the amine PACM 20).

Preferably, component (d) is a hydroxyl functional resin.

The percentages by weight of components (a) to (d) on total vehicle solids are: (a) 2–40%, (b) 3–20%, (c) 30–70%, and (d) 0–30%; preferably, (a) 8–30%, (b) 4–15%, (c) 35–65% and (d) 7–28%:

The coating composition of the present invention may also comprise a hydroxyl or other functional reactive diluents, which may lower viscosity, lower VOC and boost reactivity.

The coating composition of the present invention may also comprise additional components such as solvents, catalysts, stabilizers, fillers, rheology control agents, flow additives, leveling additives, dispersing agents and other components known to persons skilled in the art. Suitable solvents include methyl amyl ketone, butyl acetate, amyl acetate, ethoxy ethyl propionate and xylene. Suitable catalysts include aromatic or aliphatic carboxylic acids, arylsulphonic acids and organometal compounds. Acids which are useful are formic acid, acetic acid, mono-, di-, and trichloro acetic acid, oxalic acid, maleic acid, malonic acid, fumaric acid, heptanoic acid, pelargonic acid, isononanoic acd, benzoic acid, 4-hydroxybenzoic acid, mono-, di-, and trichlorobenzoic acid, and salicylic acid and anhydrides thereof. Preferred acids are acetic acid, heptanoic acid, and benzoic acid. Useful organometal compounds include zinc alkanoate, such as zinc octoate, dibutyltin dilaurate, dibutyltin (bis)mercaptide, dibutyltin diacetate, and dibutyltin sulphide. Preferred is an organo-tin catalyst such as dibutyltin dilaurate. More preferably, mixtures of organo-tin and organo-zinc catalysts are used. Also mixtures of the above-mentioned catalysts may be used.

Optionally pigments may be present in the coating composition of the present invention. Useful pigments are various types common to the art which include but are not limited to titanium dioxide, graphite, carbon black, zinc oxide, calcium sulphide, chromium oxide, zinc sulphide, zinc chromate, strontium chromate, barium chromate, lead chromate, lead cyanamide, lead silico chromate, yellow nickel titanium, yellow chromium titanium, red iron oxide, yellow iron oxide, black iron oxide, naphtol red and browns, anthraquinones, dioxa zinc violet, isoindoline yellow, arylide yellow and oranges, ultramarine blue, phthalocyanine complexes, amaranth, quinacridones, halogenated thioindigo pigments, extender pigments such as magnesium silicate, aluminium silicate, calcium silicate, calcium carbonate, fumed silica, barium sulfate, and zinc phosphate.

Preferably, the coating composition comprises less than 500 g/l (4.2 lb/gal) of volatile organic solvent based on the total composition, more preferably less than 480 g/l (4.0 lb/gal), most preferably less than 420 g/l (3.5 lb/gal). The solid resin content preferably is higher than 50%, more preferably higher than 52%, most preferably higher than 58%.

Coating compositions of the present invention are useful as clearcoats, basecoats, topcoats and primers.

The coating composition of the present invention can be used in the preparation of coated substrates. These substrates include glass, ceramics, paper, wood, plastic and metal.

The coating composition is especially useful in the refinish industry, in particular the body shop, to repair automobiles. The coating composition is also applicable in the automotive industry for the finishing of large transport vehicles, such as trains and buses, and can also be used in airplanes. The substrate may be uncoated material or can be primed. The substrate may also be coated with paint products applied at the time of manufacture or just prior to application of the compositions of the present invention. The coating composition can be applied using conventional spray equipment or high volume low-pressure spray equipment resulting in a high quality finish. Other modes of application are roller coating, brushing, sprinkling, flow coating, dipping, electrostatic spraying or electrophoresis, with spraying being preferred. Exemplary metal substrates include steel, aluminium, copper, zinc, magnesium, and alloys thereof. Curing temperatures are preferably between 0 and 80° C., and more preferably between 20 and 60° C.

The following examples illustrate the preparation of compositions according to the present invention. The examples are illustrative of the invention and contain a best mode. Comparative examples are included to illustrate the benefits of the present invention over other systems.

EXAMPLES

Example 1

A clearcoat according to the present invention was prepared as follows. Percentages given are by weight of each component mixture. The components are listed in order of addition. All components were added while stirring and were mixed on an air mixer for a minimum of 20 minutes after the addition was complete.

| Component A | Amount (%) | Type |
|---|---|---|
| PE | 42.97 | Binder (see below) (80.5% solids) |
| PUPO | 13.55 | Binder (see below) (60.8% solids) |
| Byk 358 | 0.23 | Flow & Lev. agent (Byk Chemicals, Wallingford, CT) |
| Byk 333 | 0.28 | Flow & Lev. agent (Byk Chemicals) |
| Fascat 4202 | 0.10 | Tin Catalyst (Elf Atochem, Philadelphia, PA) |
| Nuxtra Zinc | 0.65 | Zinc Catalyst (Huls) |
| butyl acetate | 13.81 | solvent (Eastman Chemical, Kingsport, TN) |
| EXXATE 600 | 5.35 | solvent (mixture of esters) (Exxon, Houston, TX) |
| methyl isobutyl ketone | 6.42 | solvent (Eastman Chemical) |
| butyl cellosolve acetate | 2.14 | solvent |
| dibasic ester aliphatic | 1.66 | solvent (DuPont, Wilmington, DE) |
| methyl amyl ketone | 12.87 | solvent (Eastman Chemical) |

Preparation of the polyester resin (PE):

Into a 10 liter round bottom reaction vessel equipped with a stirrer, packed column, condenser, heating mantle, thermometer, and nitrogen inlet, were charged:

2608 g of hexahydrophthalic anhydride, 2981 g of trimethylol propane, 2015 g of isononanoic acid, 195 g of phthalic anhydride, and 9.2 g of an aqueous solution comprising 85% phosphoric acid.

The reaction mixture was heated under a nitrogen stream of 10 liter/hour. The temperature of the mixture was gradually raised to 240° C. The reaction water was distilled off at a rate such that the temperature at the top of the packed column did not exceed 103° C. After the reaction was run at 240° C. for one hour, the nitrogen stream was increased to 50 liter/hour and the reaction continued at 240° C. until an acid value of 9.3 was reached. The reaction mixture was then cooled to 130° C. and diluted with 1,817 g of butylacetate.

A polyester polyol solution was obtained having a solids content of 80.5%, a viscosity of 7.5 Pa·s measured at 20° C., an acid value of 9.3 and a hydroxyl value of 145, both based on solids. The polyester polyol had a Tg of −2° C. The polyester polyol had an Mn of 1,900 and an Mw of 4,500 (as measured by gel permeation chromatography using polystyrene as a standard).

Preparation of the polyurethane polyol (PUPO):

Into a two liter round bottom reaction vessel equipped with a stirrer, packed column, condenser, heating mantle, thermometer, and nitrogen inlet, were charged:

426 g of 2-butyl-2-ethyl-1,3-propanediol, 440 g of butyl acetate, and 0.11 g of dibutyltin dilaurate.

The mixture was heated under a nitrogen atmosphere to 55° C. Then 934 g of a 70% solution in butylacetate of the isocyanurate trimer of IPDI (available as "VESTANAT®" T 1890 E from Hüls) were added over a period of about 60 minutes. During this addition the temperature was not allowed to exceed 70° C. After complete addition, the mixture was post-reacted at 70° C. until the NCO-content, calculated on solid ingredients, dropped below 0.1 wt %. After cooling, a clear polyurethane polyol solution was obtained having a viscosity (at 20° C.) of 2.8 Pa·s, a solids content of 60.8% (determined at 150° C. for 60 minutes) and a hydroxyl value of about 136 calculated on solids. Using polystyrene as a standard, gel permeation chromatography (GPC) indicated an Mn of 1,300 and a Mw 1,800. The polyurethane polyol had a Tg of 81° C.

| | Amount (%) | Type |
|---|---|---|
| Component B | | |
| DESMODUR N3390 | 53.73 | HDI isocyanurate (Bayer) (90% solids in butylacetate) |
| VESTANAT T1890E | 34.51 | IPDI isocyanurate (Huls) (70% solids in butylacetate) |
| DESMODUR N3400 | 10.89 | HDI Uretdione (Bayer) |
| Component C | | |
| ZOLDINE RD20 LC | 66.00 | Bicyclic oxazolidine (Angus Chemical) |
| INCOZOI LV | 34.00 | Monocyclic oxazolidine (Industrial Copolymers) |

Components A, B and C were mixed by weight as follows:

40.00 grams A 91.00 grams B 41.81 grams C

To this mixture, 15.20 grams of butyl acetate were added in order to bring the DIN Cup 4 viscosity below 20 seconds. (Viscosity was measured in a DIN flow cup number 4 in accordance with DIN 53221-1987.) The VOC of the composition was 2.38 lb/gal (285 g/l). (VOC was measured in accordance with ASTM 3960-92.)

Comparative Example (1A)

For comparative purposes, a clearcoat was made using the same components as in Example 1 except that instead of using the oxazolidine mixture C of Example 1, the aldimine "VESTAMIN®" A-139 (available from Hüls) was used. The VOC of the composition was 2.30 lb/gal (276 g/l).

Experimental Procedure.

Two E-coated cold rolled steel panels were prepared as follows: The steel panels were degreased with M600 Degreaser (commercially available from Akzo Nobel Coatings Inc., Norcross Ga.) and scuffed with a red Scotch Brite pad. Then the panels were degreased again with M600. "AUTOBASE" (commercially available from Akzo Nobel Coatings) was reduced with 790 Reducer Slow (commercially available from Akzo Nobel Coatings) at a 100:80 mixing ratio (by volume). The following AUTOBASE color formula was used:

|  | wt. % (before addition of reducer) |
| --- | --- |
| toner 777 | 10 |
| toner 666 | 10 |
| toner 333C | 40 |
| toner 956 | 40 |

After reduction with 790 Reducer, three coats plus one drop coat of basecoat was applied using a SATA NR95 HVLP spray gun (with 1.3 tip set) at 10 psi air pressure at the gun at 70° F. and 16% relative humidity. A 5–10 min. flash was given between coats and 30 minutes before application of the clearcoat.

The compositions of Example 1 and Comparative Example 1A were applied in two coats by means of HVLP spraying (SATA NR95 with 1.5 tip set at 10 psi) at 70° F. and 16% relative humidity. The first coats were allowed to flash for 10 minutes before application of the second coat. All clearcoats were applied to a dry filmbuild of approximately 3 mils. All clearcoats were baked for 1 hour at 140° F. They were then tested for cure speed. Hardness and adhesion were tested after 1 day storage at 70° F. and 16% RH. The results are shown in Table 1:

TABLE 1

|  | Ex. 1 | Comp. Ex. 1A |
| --- | --- | --- |
| Cure [1]<br>(60 min. @ 60° C.) | Cured, slightly tacky | Cured |
| Persoz Hardness [2]<br>after 1 day @ at 70° F., 16% RH | 83 | 209 |
| Adhesion [3]<br>after 1 day @ 70° F., 16% RH | 9–10 | 6–7 |

[1] Cure determined manually by pressing a finger in the fresh clearcoat film.
[2] Persoz Hardness according to ISO 1522-1973 using steel instead of glass plate.
[3] Cross Cut adhesion testing with tape, "10" indicating no adhesion failure, "0" indicating complete adhesion failure.

As can be seen from the above data, the composition of Example 1, which embodies the present invention, showed good adhesion, acceptable hardness and an acceptable time to cure. In comparison, the composition that contained the aldimine instead of the oxazolidines (Comparative Example 1A) showed good cure and hardness level, but shows poor adhesion.

Example 2

A primer was made according to the present invention and prepared from the following: (Percentages given are by weight of the total coating composition mixture).

| | |
| --- | --- |
| 4.0% | DESMOPHEN 670-80 polyester resin (Bayer) |
| 4.0% | JONCRYL SCX 910 acrylic resin (S.C. Johnson) |
| 12.8% | ZOLDINE RD-20 |
| 4.2% | INCOZOL LV |
| 14% | DESMODUR IL, an aromatic polyisocyanate based on TDI (51% solids in butylacetate) (Bayer) |
| 15.8% | MONDUR MRS, an aromatic polyisocyanate based on diphenylmethane 4,4 diisocyanate (Bayer) |
| 3% | DESMODUR 3400, uretdione of HDI (Bayer) |

Other components (42.3%)

| | |
| --- | --- |
| 20.8% | Pigments, including anti-corrosive pigments, fillers, $TiO_2$ and Carbon black |
| 4.7% | Flow agent, polyacrylate type |
| 16.8% | Solvents, including esters and ketones |

The primer was prepared as follows. Into a clean, dry tank were charged and mixed:

| | |
| --- | --- |
| 776.7115 g | DISPERBYK-110 (dispersant) (Byk) |
| 268.0569 g | butyl acetate |

While mixing, the following were added:

| | |
| --- | --- |
| 650.6976 g | DESMOPHEN 670A-80 |
| 650.6976 g | JONCRYL SCX 910 |

The following were then added under mixing:

| | |
| --- | --- |
| 53.4307 g | COSMIC BLACK D-2 (carbon black) (Ebonex, Melvindale, MI) |
| 379.9135 g | BLANC FIXE MICRO (filler pigment) (Sachtleben Chemie, Duisburg, Germany) |
| 975.1328 g | TALC 399 LO MICRON MAGNESIUM SILICATE (filler pigment) (Barretts Minerals, Bethlehem, PA) |
| 703.8150 g | WOLLASTOCOAT 10ES (filler pigment) (Nyco, Willsboro, NY) |
| 703.8755 g | TI-PURE R-902 28 ($TiO_2$) (DuPont, Wilmington, DE) |
| 626.4065 g | HALOX CW 491 (anticorrosive pigment) (Halox Corp., Hammond IN) |

Mixing was continued for five minutes, then DYNOMILL ground to 20–25 microns, as verified by a quality control grind check. The following was then added while mixing:

600.0000 g butyl acetate

A quality control check was made of 1 quart to check the percentage of non-volatiles (acceptable is 81.8±2.0). Also checked was Stormer viscosity (95–100 Krebs units) and density (14.07±0.5 lbs./gal). It is important that the tank be kept closed during this quality control check. The batch must be filled within 24 hours. The batch was filtered through a 100 micron bag.

Activator

Into a clean, dry tank were charged:

| | |
| --- | --- |
| 200.7000 g | ZOLDINE RD-20 |
| 66.6700 g | INCOZOL LV |

This was mixed on low speed for 5 minutes. Then the following was added and mixed together for 30 minutes:

| | |
| --- | --- |
| 1.4400 g | DESMOPHEN 670A-80 |
| 0.3600 g | MULTIFLOW (flow and leveling agent) (Monsanto, St. Louis, MO) |
| 37.5000 g | methyl amyl ketone |
| 37.5000 g | ethyl amyl ketone |
| 88.8900 g | butyl acetate |

A 1 quart sample was subject to a quality control check for density (7.42±0.5) and viscosity in a # 4 cup at 77° F.

(12.0±2.0). It is important that the tank be kept closed during the quality control check.

Hardener

Under conditions to minimize moisture content, into a clean, dry, closed tank blanketed with nitrogen, were dosed and mixed on low speed for 10 minutes:

| 4.5359 lb | DESMODUR IL |
|---|---|
| 5.1454 lb | MONDUR MRS |
| 0.9681 lb | DESMODUR 3400 |

Water content was checked on a 4 oz. sample. Water content should be less than 1500 ppm. Then was added:

| 0.1817 lb | n-butyl acetate |
|---|---|
| 0.0872 lb | DOWANOL PMA (Dow, Midland, MI) |
| 0.0654 lb | butyl cellosolve acetate |
| 0.0291 lb | Aromatic 100 (Exxon) |

Water content was again checked. The solvent blend was mixed on low speed for 30 minutes. A 1 quart sample was subject to a quality control check for density (9.65±0.5), percentage non-volatiles (75.1±2.0) and viscosity with #4 cup at 77° F. (60.0±3.0). It is important that the tank be kept closed during the quality control check. The batch must be filled within 24 hours and filtered through a 10 micron bag. The VOC of the composition was 2.8 lb/gal. (335 g/l)

Comparative Examples

For comparative purposes, three additional primers were made using the same components as in Example 2 except that instead of using the oxazolidine mixture of Example 2 the following were used:

Comparative Example 2A was made with a di-monocyclic oxazolidine ("INCOZOLT™" LV) as the sole oxazolidine component.

Comparative Example 2B was made with a bicyclic oxazolidine ("ZOLDINE®" RD 20) as the sole oxazolidine component.

Comparative Example 2C was made with an aldimine ("VESTAMIN®" A139 available from Hüls) instead of the oxazolidine component. The VOC of these compositions was 2.8 lb/gal (335 g/l).

The composition of Examples 2 and Comparative examples 2A, 2B, and 2C were applied using a SATA 95 1HVLP spray gun and both ambient air cured and baked 60 minutes at 60° C. (140° F.). They were tested for dry times (dust free and tack free) and crosshatch adhesion. Example 2' is the same as example 2 except that the dust free and tack free times were measured under 25% relative humidity versus 70% relative humidity of Example 2. Comparative Examples 2A, 2B and 2C were subject to 21% relative humidity. The results are shown below in Table 2.

TABLE 2

| Ex. | Viscosity (#4 Ford, 25° C., sec.) | Dust Free (min.) | Tack Free (min.) | Pot life (min.) | Adhesion (X-Cut) | Temp/ Relative Humidity |
|---|---|---|---|---|---|---|
| 2 | 17 | 27 | 28 | 50 | 10 | 71.8° F./70% |
| 2' | 17 | 46 | 65 | 50 | 10 | 71° F./25% |
| 2A | 18 | 50 | 100 | 40 | 10 | 71° F./21% |
| 2B | 17 | 100 | 100 | 45 | 10 | 71° F./21% |
| 2C | 22 | 9 | 19 | 30 | 10 | 71° F./21% |

Pot life is the time between the initial mixing of all components and the point where the viscosity has increased to 2 times the initial viscosity.

Example 2 (mixture of oxazolidines) showed improved potlife over 2C (aldimine), and to a lesser extent over 2A (monocyclic alone) and 2B (bicyclic alone). The tack free time of example 2 is much improved over both the 2A (monocyclic) and 2B (bicyclic), and dust free time is much improved over 2B (bicyclic). Viscosity is lower in example 2 over 2C (aldimine). Adhesion was equivalent throughout.

Example 3

A clearcoat according to the present invention (3C) and four comparative examples (3A, 3B 3D and 3E) were prepared as in Example 1 using the following ingredients.

| Clear Formulation | |
|---|---|
| PE | 42.75 g |
| PUPO | 13.48 g |
| 20% BYK 310 in BuAc (flow and lev. Agent) (Byk) | 2.98 g |
| 10% T-12 in BuAc | 99 g |
| methyl N-amyl ketone | 9.95 g |
| methyl N propyl ketone | 29.85 g |
| Total | 100 g |
| VOC | 4.45 Lbs/Gal |

| Hardener Formulation | |
|---|---|
| DESMODUR N-3390 | 92.27 g |
| methyl N-propyl ketone | 7.73 g |
| Total | 100 g |
| VOC | 1.55 Lbs/Gal |

| Activator Formulas | | | | |
|---|---|---|---|---|
| | A | B | C | D |
| ZOLDINE RD-20 | 100 g | — | 66 g | — |
| INCOZOL LV | — | 100 g | 34 g | — |
| VESTAMIN A-139 | — | — | — | 100 g |
| Total | 100 g | 100 g | 100 g | 100 g |
| VOC | 0.00 Lbs/Gal | 0.00 Lbs/Gal | 0.00 Lbs/Gal | 0.00 Lbs/Gal |

Example 3C and Comparative Examples

| | 3A | 3B | 3C | 3D | 3E |
|---|---|---|---|---|---|
| Clear | 24.39 | 24.39 | 24.39 | 24.39 | — |
| Hardener | 48.78 | 48.78 | 48.78 | 48.78 | — |
| Activator A | 24.39 | — | — | — | — |
| Activator B | — | 24.39 | — | — | — |
| Activator C | — | — | 24.39 | — | — |
| Activator D | — | — | — | 24.39 | — |
| methyl N-amyl ketone | 2.44 | 2.44 | 2.44 | 2.44 | — |
| AUTOCLEAR II | — | — | — | — | 100 ml |

-continued

|  | 3A | 3B | 3C | 3D | 3E |
|---|---|---|---|---|---|
| AUTOCRYL Hardener | — | — | — | — | 50 ml |
| AUTOCRYL Reducer Medium | — | — | — | — | 30 ml |
| Total | 100 g | 100 g | 100 g | 100 g | 180 ml |
| VOC (Lbs/Gal) | 2.1 | 2.1 | 2.1 | 2.1 | 4.4 |
| X-Link | 87% | 70% | 80% | 103% | — |

Conditions: 38% rH, 80° F.

Example 3C was prepared according to the present invention using a mixture of bicyclic and monocyclic oxazolidines. Comparative Example 3A was prepared using only bicyclic oxazolidine. Comparative Example 3B was prepared using only monocyclic oxazolidine. Comparative Example 3D was prepared using aldimine instead of oxazolidine. Comparative Example 3E is used to show a conventional composition (using "AUTOCLEAR®" and "AUTOCRYL®" components available from Akzo Nobel Coatings Inc.) with acceptable properties that has a higher VOC content than the composition of the present invention.

Results

Test results are shown in the following tables comparing potlife, drying characteristics, physical properties (adhesion and Persoz hardness), gloss and DOI (distinctness of image).

| Potlife | | | | |
|---|---|---|---|---|
|  | Inital | 30 min | 60 min | Potlife |
| 3A | 17.87 sec | 19.04 sec | 19.85 sec | >60 minutes |
| 3B | 19.32 sec | 21.12 sec | 23.00 sec | >60 minutes |
| 3C | 18.31 sec | 23.47 sec | 26.97 sec | 60 minutes |
| 3D | 21.29 sec | 34.28 sec | 48.22 sec | 30 minutes |
| 3E | 16.12 sec | — | 17.56 sec | >60 minutes |

The results show that the composition according to the present invention, 3C, shows an improved potlife over 3D (the composition using the aldimine instead of the oxazolidine). The potlife of 3D is short, but may still be acceptable for small applications such as spot and panel repairs. However, it would be unacceptable for a complete overspray.

| Drying Characteristics - Bake 60° C. | |
|---|---|
|  | Dry to Handle |
| 3A | >120 min NOK |
| 3B | 25 min excellent |
| 3C | 35 min good |
| 3D | 15 min outstanding |
| 3E | 25 min excellent |

NOK = not OK

Drying characteristics of the bi-/mono-cyclic oxazolidine mixture 3C were improved over the bicyclic oxazolidine alone (3A) at 60° C. In fact, 3A was still wet after the normal 35 minute bake period at 60° C. This was not acceptable.

| Physical Properties | | | | | |
|---|---|---|---|---|---|
| Adhesion | | | Persoz hardness | | |
|  | 3 Day | 6 Day | 10 Day | 3 Day | 6 Day | 10 Day |
| 3A | 10 | 10 | 10 | 209/NOK* | 244/NOK* | 255/NOK* |
| 3B | 2 | 1 | 1 | 51 | 57 | 68 |
| 3C | 10 | 10 | 10 | 103 | 119 | 133 |
| 3D | 5 | 5 | 5 | 74 | 80 | 85 |
| 3E | 10 | 10 | 10 | 116 | 142 | 158 |

NOK = not OK
*panels of 3A had to baked for > 120 minutes in order to cure to dry to handle. The panels were deemed not acceptable because the hardness would not have been acceptable after a normal 35 minute cure.

The baked panels were tested for adhesion and Persoz hardness. The composition of the present invention comprising the bicyclic and monocyclic oxazolidine (3C) shows improved adhesion and hardness over 3B (monocyclic oxazolidine alone) and over 3D (aldimine), and also improved hardness over 3A (bicyclic oxazolidine alone) under normal baking conditions (see note above).

| Gloss | | | DOI | | |
|---|---|---|---|---|---|
|  | 3 Day | 6 Day | 10 day | 3 Day | 6 Day | 10 Day |
| 3A | 82.5 | 82.9 | 83.4 | 80 | 80 | 80 |
| 3B | 85.0 | 82.4 | 82.1 | 85 | 85 | 85 |
| 3C | 83.3 | 81.8 | 78.9 | 80 | 80 | 80 |
| 3D | 82.9 | 83.7 | 83.1 | 80 | 80 | 80 |
| 3E | 81.9 | 80.0 | 79.8 | 80 | 80 | 80 |

Gloss is measured in accordance with ISO 2813:1994 (angle 20°) and is expressed in GU.

DOI is determined by projecting a standard (original) image on a coating. The sharpness of the reflected image and of the original image is compared. If the reflected image is (nearly) as sharp as the original image, the DOI of the coating is high. If the reflected image is much less sharp than the original image, the DOI of the coating is low.

The gloss and DOI (distinctness of image) data indicate that appearance of all of the panels is acceptable. No appreciable difference was seen after 6 and 10 days.

One skilled in the art will appreciate that the present invention can be practiced by other than the described embodiments, which are presented for purposes of illustration and not of limitation, and the present invention is limited only by the claims that follow.

We claim:

1. A coating composition comprising:

(a) a bicyclic oxazolidine compound of the structure:

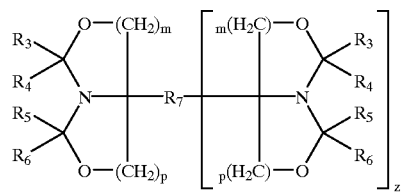

wherein
z is from 0 to 9;

m and p are independently selected from 1 and 2;

$R_3$, $R_4$, $R_5$ and $R_6$ may be the same or different and are selected from the group of hydrogen, linear or branched (cyclo)alkyl, and linear or branched aryl, optionally substituted;

$R_3$ and $R_4$, and $R_5$ and $R_6$ may be joined together to form a 5 or 6 carbon ring with the attached carbon atom of the ring in the formula, i.e. $R_3$ and $R_4$, and $R_5$ and $R_6$ collectively represent a tetramethylene or a pentamethylene group; and $R_7$ is a mono- or multivalent aliphatic, aromatic, arylaliphatic or cycloaliphatic moiety which may optionally contain oxygen, nitrogen, sulphur, and silica; and $R_7$ may be H when z=0;

(b) a monocyclic oxazolidine compound of the structure:

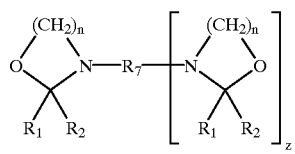

wherein
z is from 0 to 9;
n is 2 or 3;

$R_1$ and $R_2$ may be the same or different and are selected from the group of hydrogen, linear or branched (cyclo)alkyl, and linear or branched aryl, optionally substituted;

$R_1$ and $R_2$ may be joined together to form a 5 or 6 carbon ring with the attached carbon atom of the ring in the formula, i.e. $R_1$ and $R_2$ collectively represent a tetramethylene or a pentamethylene group; and $R_7$ is a mono- or multivalent aliphatic, aromatic, arylaliphatic or cycloaliphatic moiety which may optionally contain oxygen, nitrogen, sulphur, and silica; and $R_7$ may be H when z=0; and (c) an isocyanate functional compound.

2. The composition of claim 1 wherein component (a) has the formula:

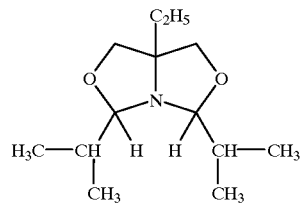

3. The composition of claim 1 wherein in component (b) z=1.

4. The composition of claim 1 wherein in component (b) z=1, n=2, $R_1$ is hydrogen, $R_2$ is isopropyl, and $R_7$ has the structure:

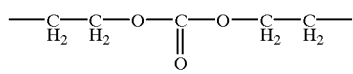

5. The composition of claim 1 wherein component (c) is selected from an aromatic and an aliphatic isocyanate functional compound.

6. The composition of claim 1 further comprising a hydroxy functional reactive diluent.

7. A method of coating a substrate comprising coating the substrate with the composition of claim 1.

8. A method of coating a substrate comprising coating the substrate with the composition of claim 6.

9. A coated substrate coated with the composition of claim 1.

10. A coated substrate coated with the composition of claim 6.

* * * * *